4, 1969

3,431,329
METHOD OF PREPARING A FUEL MATERIAL
FOR USE IN A NUCLEAR REACTOR
George D. White and Joseph H. Handwerk, Joliet, Ill.,
assignors to the United States of America as represented
by the United States Atomic Energy Commission
No Drawing. Filed Jan. 31, 1968, Ser. No. 701,858
U.S. Cl. 264—.5                                    1 Claim
Int. Cl. G21c 21/00

ABSTRACT OF THE DISCLOSURE

A method of preparing a fuel material for use in a nuclear reactor. The method comprises mixing commercial uranium dioxide, zirconium diboride, and uranium hydride. The amount of uranium hydride added is that amount necessary to react with the hyperstoichiometric oxygen inherently present in commercial uranium dioxide. The mixture is then sintered in vacuum as an inert gas so as to obtain a fuel material containing a predetermined amount of boron as burnable poison.

CONTRACTUAL ORIGIN OF THE INVENTION

The invention described herein was made in the course of, or under, a contract with the United States Atomic Energy Commission.

BACKGROUND OF THE INVENTION

This invention relates to the production of nuclear fuel materials and, more particularly, to a method of preparing a fuel material for a nuclear reactor containing a predetermined amount of a burnable poison.

A burnable poison is a material of cross section greater than the fuel, depletion of which compensates for both depletion of fuel and accumulation of fission-product poisons. Such use of burnable poisons increases the endurance of reactors by permitting larger initial fuel loading.

Boron is one of the most widely utilized neutron-absorbing material for nuclear reactors. Because of its high thermal neutron cross section, relatively predictable nuclear behavior, availability, and relatively low cost, boron has found application in many reactors, large and small, as either a burnable poison, control or shielding material. Boron is particularly desirable as a burnable poison in reactor operation because it is depleted without leaving a high cross-section residue at the end of core life.

Uranium dioxide has found acceptance as a nuclear fuel material since it is comparatively inexpensive, has a high melting point, does not react chemically with common coolants, and is dimensionally stable under irradiation. However, a problem arises when boron is to be dispersed in uranium dioxide as a burnable poison. In the first place, neither boron nor boron oxide can be used as such since boron reacts with uranium dioxide to form boron oxide which sublimes at relatively low temperatures. The most likely candidates for use are the borides, notably zirconium diboride, which is the most stable boride. Unfortunately zirconium diboride reacts with oxygen to form boron oxide and oxygen is given off when commercial uranium dioxide is sintered. This oxygen is contained in commercial uranium dioxide as hyperstoichiometric oxygen; that is, oxygen present in excess of that called for by the formula $UO_{2.00}$. Due to the quantities involved—and the fact that its properties are better in some respects—commercial uranium dioxide must be used when preparing fuel material for a large reactor. This is true because stoichiometric uranium dioxide, $UO_{2.00}$, must be prepared and stored out of contact with air. Obviously it is difficult to specify the amount of boron to add to a fuel material to attain a desired effect if an unpredictable amount of the boron will be volatilized prior to use of the fuel material.

SUMMARY OF THE INVENTION

According to this invention an amount of uranium hydride calculated to react with the hyperstoichiometric oxygen present in commercial uranium dioxide is mixed with commercial uranium dioxide and zirconium diboride in a vacuum or an inert atmosphere. At about 200° C. the uranium hydride decomposes and hydrogen is driven off. This is too low a temperature for the hydrogen to react with boron to form volatile boron-hydrogen compounds. The freed uranium is then available to react with the excess oxygen present in uranium dioxide.

DESCRIPTION OF THE PREFERRED EMBODIMENT

Commercial uranium dioxide was analyzed and found to have a formula of $UO_{2.10}$. This was mixed with sufficient zirconium diboride so that the mixture contained 0.5% boron and the mixture was divided into three equal portions. One portion was kept as a control, 0.10 atom equivalents of carbon was added to the second portion and 0.10 atom equivalents of uranium hydride was added to the third. Each of these compositions was ball-milled, pressed into pellets, and sintered in vacuum for two hours. The following table shows the effect of the additives on boron retention.

Boron analysis of $UO_2$ containing $ZrB_2$

| Initial boron content 0.5%: | Percent boron |
|---|---|
| $UO_2 + ZrB_2$ | 0.36 |
| $UO_2 + ZrB_2 + C$ | 0.42 |
| $UO_2 + ZrB_2 + UH_3$ | 0.47 |

It is apparent that 28 percent of the boron was lost from the control, 16 percent of the boron was lost when carbon was added as the oxygen getter, but only 6 percent of the boron was lost when uranium hydride was used as oxygen getter.

Since uranium hydride decomposes at a few hundred degrees and it is in fact free uranium which reacts with the excess oxygen, it might appear that uranium should be used directly. This is not practical since finely divided uranium oxidizes very easily and may be pyrophoric. Also uranium powder is normally prepared by going through the hydride.

The amount of hydride required is just that amount necessary to react with the excess oxygen of the non-stoichiometric uranium dioxide. While a slight excess of hydride could be tolerated, obviously if the benefits of the present invention are to be attained, a deficiency cannot be tolerated.

It will be understood that the invention is not to be limited to the details given herein but that it may be modified within the scope of the appended claim.

The embodiments of the invention in which an exclusive property or privilege is claimed are defined as follows:

1. A method of preparing a fuel material for use in a nuclear reactor comprising mixing commercial uranium dioxide, zirconium diboride, and uranium hydride, the amount of uranium hydride being that amount necessary to react with the hyperstoichiometric oxygen inherently present in commercial uranium dioxide, and sintering the mixture in vacuum or an inert gas to obtain a fuel materal containing a predetermined amount of boron as burnable poison.

References Cited

UNITED STATES PATENTS

| | | | |
|---|---|---|---|
| 3,263,004 | 7/1966 | Bean | 264—.5 |
| 3,320,176 | 5/1967 | Davis | 252—301.1 |
| 3,349,152 | 10/1967 | Watanabe et al. | 264—.5 |
| 3,361,857 | 1/1968 | Rose | 264—.5 |
| 3,372,213 | 3/1968 | Nishiyama et al. | 264—.5 |

BENJAMIN R. PADGETT, *Primary Examiner.*

MELVIN R. SCOLNICK, *Assistant Examiner.*

U.S. Cl. X.R.

252—301.1; 75—200